A. H. WELKER.
LAMP.
APPLICATION FILED JUNE 13, 1912.
1,067,085.
Patented July 8, 1913.
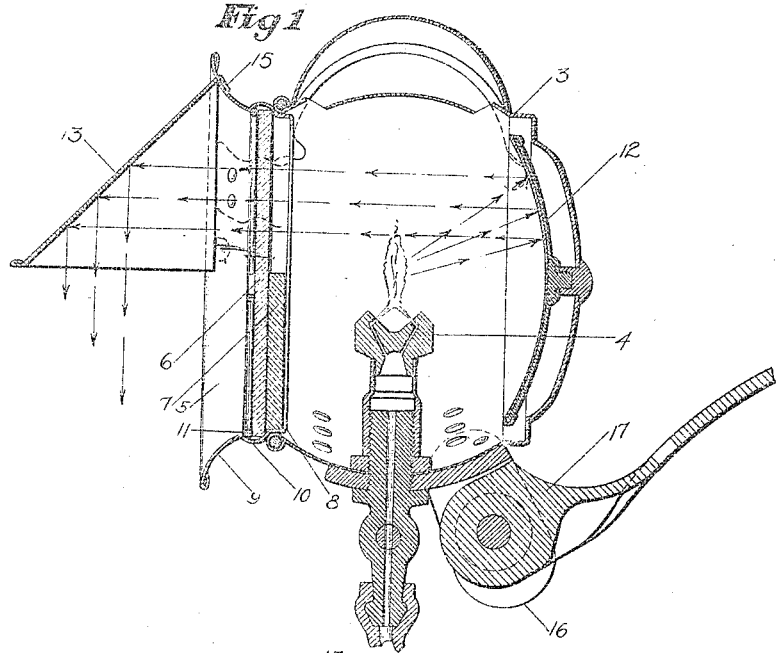
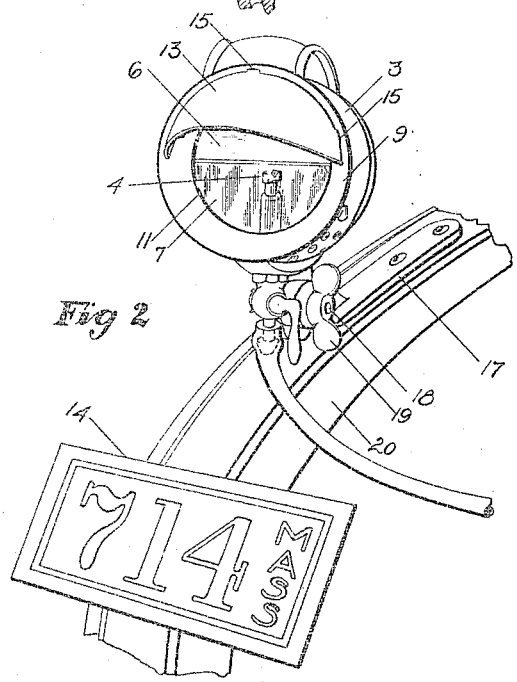
Witnesses:
Horace A. Crossman
Carl L. Choate
Inventor
Alexander H. Welker,
by Emery, Booth, Janney & Varney
Attys

UNITED STATES PATENT OFFICE.

ALEXANDER H. WELKER, OF BERLIN, ONTARIO, CANADA, ASSIGNOR TO HAWTHORNE MANUFACTURING COMPANY, INC., OF BRIDGEPORT, CONNECTICUT, A CORPORATION OF CONNECTICUT.

LAMP.

1,067,085.   Specification of Letters Patent.   Patented July 8, 1913.

Application filed June 13, 1912. Serial No. 703,581.

*To all whom it may concern:*

Be it known that I, ALEXANDER H. WELKER, a subject of the King of England, and a resident of Berlin, in the Province of Ontario and Dominion of Canada, have invented an Improvement in Lamps, of which the following description, in connection with the accompanying drawings, is a specification, like characters on the drawings representing like parts.

This invention relates to lamps, being more particularly, though not exclusively, concerned with tail lamps for vehicles and will be best understood by reference to the following specification, when taken in connection with the accompanying illustration of one specific embodiment thereof, while its scope will be more particularly pointed out in the appended claims.

In the drawings:—Figure 1 is a central, vertical sectional view of a tail lamp embodying my invention; and Fig. 2 is a perspective view of the lamp and a number-plate, showing their relation with each other and mode of supporting them on a vehicle, a portion of the latter being shown.

Referring to the drawings, and to the specific embodiment of my invention which I have there disclosed for illustrative purposes, I have there shown a lamp having a casing 3, which may be of any suitable usual or desired construction having therein suitable light-furnishing means, the particular character of which is not essential, but which is herein shown as an acetylene gas burner 4, it being understood that any other suitable light-furnishing means may be employed if desired.

The casing 3 is provided with an aperture 5, across which may be disposed suitable light-transmitting means, herein comprising a white light-transmitting medium 6, and another light-transmitting medium 7, the latter having preferably a different color characteristic from the former, and preferably being red. These light-transmitting elements may be of any suitable material, as for example glass, and may be supported in the casing in any suitable manner, but I have herein provided an annular flange 8, forming a seat for the red glass 7. The annular flange 8 may be formed as part of an annular bell-shaped frame 9, which may be provided with an annular groove 10 to receive the white glass 6, and a retaining ring 11, to hold both of the glasses in place. While I have herein shown the white glass extending across the red glass, this is not essential, but the lower half of the white glass may be omitted if desired. I prefer, however, to carry the white glass entirely across the opening, so as to better exclude moisture and dust. There may be provided a suitable light-reflecting means for reflecting the rays of light through the glasses 6 and 7, herein a concave reflector 12, which may be supported in the casing in any suitable manner.

It is customary to require motor vehicles to carry a number-plate, and to require that the latter shall be properly illuminated at night, so as to be plainly visible at a certain distance fixed by statute. In order that the same lamp may be utilized to show the red light at the rear and to illuminate the number-plate with the white light, I may provide suitable light-reflecting means, herein a reflector 13 located in the path of the rays of light passing through the upper half of the white glass, and serving to reflect the white light onto the number-plate 14, while at the same time serving as a shield to prevent the white light from being visible at the rear, so that only the red light shows. The shield also serves to shield and protect the glass from rain and snow as well as to protect the same against accidental injury. While this reflector may be of any suitable character, it is herein shown as being concavo-convex, with its concave surface at the inside, and so shaped and of such proportions as to concentrate and reflect the white light onto the number-plate. This reflector may be secured to the frame 9 of the casing 3 in any suitable manner, as by means of a plurality of lugs 15, passing through and secured to the latter, as by soldering the same thereto. In Fig. 2, I have shown a lamp as it is viewed from a point near the ground adjacent the vehicle, and in this view, the upper portion of the white glass shows somewhat beneath the lower edge of the reflector 13, but in actual practice, the lamp will be placed at such a height that only the red light will be visible from the rear, while all of the white light will be reflected onto the number-plate.

The lamp may be supported by any suitable means on a vehicle, as for example by providing the lamp casing with a pair of ears 16, embracing a bracket 17, and clamped against the latter by a screw 18, having a thumb nut 19. By this means, the lamp may be adjusted so as to permit relative adjustment of the reflector 13 and the number-plate 14 to vary the direction of the rays of light directed toward the latter. For the sake of illustration, I have shown in the drawings a mud-guard 20 of a motor cycle, and have shown the number-plate 14 and the bracket 17 secured thereto. Preferably the number-plate 14 is so placed that its display surface is disposed at an angle, and the rays of light reflected thereonto, as illustrated in Fig. 2.

While I have herein shown and described one form of my invention for illustrative purposes, and have disclosed and discussed in detail the construction and arrangement incidental to one specific embodiment thereof, it is to be understood that the invention is limited neither to the mere details nor relative arrangement of parts, nor to its specific application herein shown, but that extensive deviations from the illustrated form or embodiment of the invention may be made without departing from the principles thereof.

Having thus described one form of my invention, what I claim is:—

1. A lamp having, in combination, light-furnishing means, light-transmitting means including two elements of different color characteristics through which elements the rays of light pass in one direction, and light-reflecting means located in the path of the rays passing through one of said elements and forming a shield for the latter.

2. A lamp having, in combination, light-furnishing means, light-transmitting means including two elements having different color characteristics, light-reflecting means for reflecting the rays of light from the light-furnishing means through said light-transmitting means, and light-reflecting means disposed at an angle to the path of the rays passing through said light-transmitting means and arranged to shield one of said elements.

3. A lamp having, in combination, light-furnishing means, light-transmitting means including two elements having different color characteristics, light-reflecting means for directly reflecting the rays of light from the light-furnishing means through both of said elements, and light-reflecting means disposed at an angle to the path of the rays passing through one of said elements and forming a shield for the latter.

4. The combination with an object to be illuminated, of a casing, light-furnishing means within said casing, light-reflecting means located externally of said casing for reflecting a portion of the rays of light in one direction onto said object, and means for giving other rays of the light a different color characteristic and transmitting them in another direction across the path of the first rays.

5. The combination with an object to be illuminated, of light-furnishing means, light-reflecting means for reflecting a portion of the rays of light in one direction onto said object, and means for transmitting other rays of the light in another direction across the path of the first rays, said object having a display surface disposed at an angle to the rays of light reflected thereonto.

6. A lamp having, in combination, a casing having an aperture, light-furnishing means in said casing, light-transmitting means comprising two elements having different color characteristics disposed across said aperture, and light-reflecting means located exteriorly of said casing and disposed at an angle to both of said light-transmitting elements.

7. A lamp having, in combination, a casing having an aperture, light-furnishing means in said casing, light-transmitting means including two elements disposed across said aperture, one of said light transmitting elements being colored, and light-reflecting means located exteriorly of said casing for reflecting the rays of light which pass through the other of said elements.

In testimony whereof, I have signed my name to this specification, in the presence of two subscribing witnesses.

ALEXANDER H. WELKER.

Witnesses:
   ARTHUR B. POLLOCK,
   E. H. WARNER.